May 23, 1933.    H. N. CHARLES    1,910,590
VEHICLE BRAKE
Filed Jan. 12, 1931    2 Sheets-Sheet 1
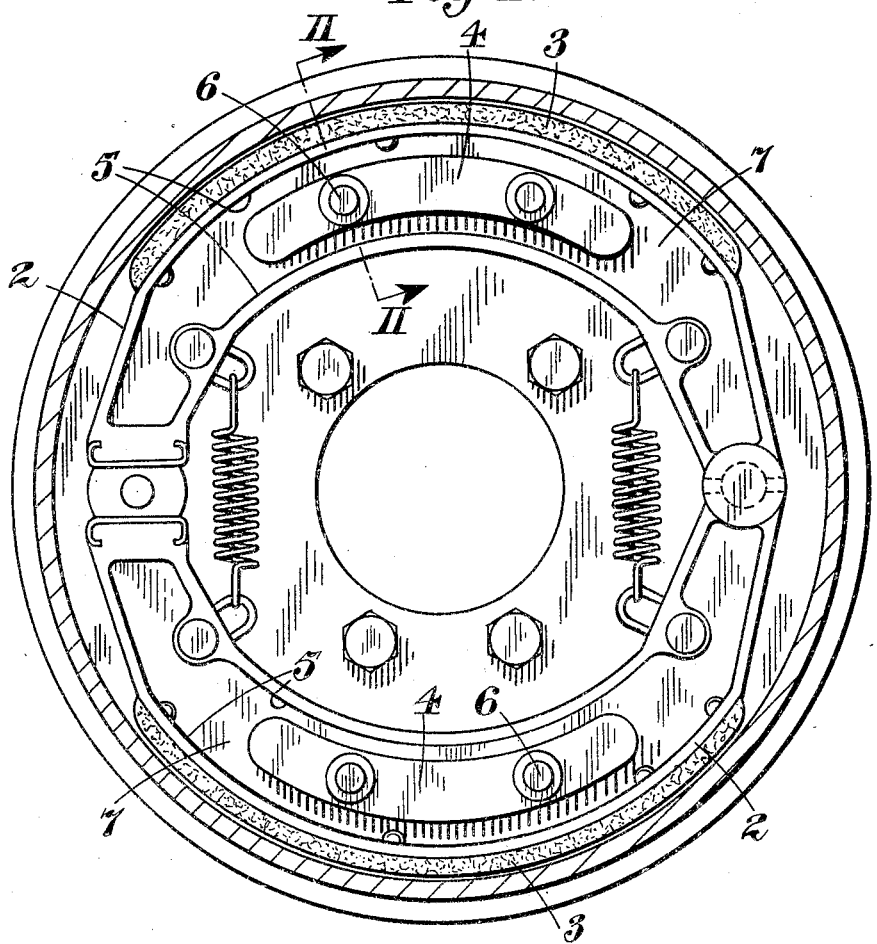
Inventor:
Hubert N. Charles,
By Mawhinney & Mawhinney,
Attys.

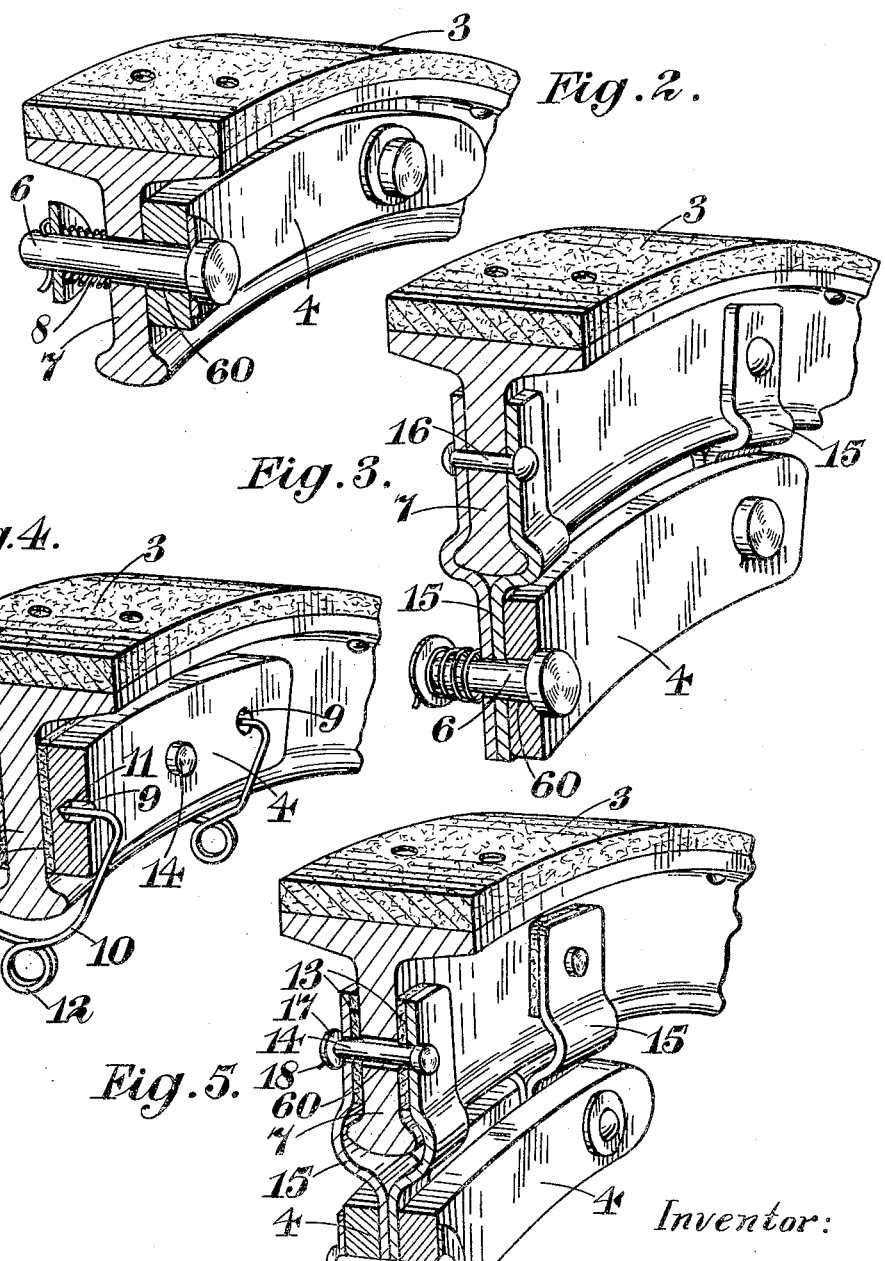

Patented May 23, 1933

1,910,590

UNITED STATES PATENT OFFICE

HUBERT NOEL CHARLES, OF ABINGDON-ON-THAMES, ENGLAND

VEHICLE BRAKE

Application filed January 12, 1931, Serial No. 508,315, and in Great Britain September 17, 1930.

This invention relates to vehicle brakes, and particularly to internal-expanding brakes on motor vehicles, and it has for its chief object to provide an improved arrangement by which squeaking of the brakes when they are applied will be reduced or altogether obviated.

Squeaking of the brakes arises mainly from vibrations which are generated in or communicated to the brake shoes or the equivalent, and the invention broadly consists in the combination therewith of a vibration damper acting thereon to absorb these vibrations.

According to a further feature of the invention, means is associated with one of the relatively moving parts of the brake for frictionally absorbing or damping the squeak-producing vibrations.

The invention further particularly consists in associating a weight with the brake shoe or the equivalent for limited relative movement with respect thereto and in yieldingly pressing the weight into frictional contact with the brake shoe or a part rigidly secured thereto.

In the accompanying drawings, illustrating alternative arrangements in accordance with the invention, in each of which the vibration damper is carried by the brake shoe.

Figure 1 is a view of a pair of shoes in elevation, the brake drum being in section, Figure 2 is a fragmentary cross section of a shoe in perspective, the plane of the section being substantially on the line II, II of Figure 1, and Figures 3, 4 and 5 are similar perspective cross sectional views showing different methods of mounting the vibration damping means on a shoe.

In Figure 1 each brake shoe 2 is provided as usual with a frictional braking element 3 on its outer periphery, and the weight 4 is mounted on the side of the shoe in a longitudinal channel or groove 5, but with a clearance so as to allow of movement of the weight with respect to the shoe preferably in all directions.

For securing the weight, one or more studs 6 extend through the weight and the web 7 of the brake shoe with clearances, as shown at 60, and a coil compression spring 8 is mounted on each stud to press the weight against the web 7. Alternatively, the weights may be attached by means, for example, of spring clips. For example, in Figures 4 there is a weight located on each side of the web 7 and to retain these in position each is provided on its outer surface with one or more blind holes 9, the weights being arranged so that the corresponding holes are coaxial. A modified hairpin spring 10 has its free ends 11 turned inwardly towards one another and the intermediate part formed into one or more convolutions 12. When the ends 11 are sprung apart they can be engaged in the coaxial holes 9 in the shoes so that the latter are pressed firmly against the co-operating surfaces of the web 7. Preferably, a strip of friction material 13 is disposed between the adjacent surfaces of each weight and web and may be attached to either. One or more pins 14 extend through clearance holes in the weights and web to locate them roughly during fitting and to prevent them falling into the brake should the springs fail.

Instead of locating the weight on the side of the web it may be disposed below it as shown in Figures 3 and 5.

In Figure 3 the weight 4 is attached at one or more places along its length to the lower part of brackets 15 each of which is constituted by a pair of metal straps shaped above the weight to the external shape of the web 7. A rivet 16 extends through the plates and web to secure the bracket. The weight may, as shown, be attached to the bracket in the manner described in connection with Figures 1 and 2, or a pair of weights, one each side the bracket, may be arranged according to the method of Figure 4.

As a modification of Figure 3 the brackets 15 of Figure 5 are of spring steel so that they form spring clips which resiliently grip the web 7 through interposed friction material 13. The weights 4 are rigidly attached, as by rivets, to the lower portions of the spring clips. To prevent displacement of the latter from the web 7 either by vibration or the weights themselves, a pin 14 is passed through the upper parts of each spring clip and a clearance hole 60 in the intermediate web portion of the shoe, the pin being secured by a washer 17 and split pin 18.

It will be evident that only a limited relative movement between the weight and shoe is necessary, and spring pressure exerted either on the weight itself or its attachment to the shoe must not be so high as to prevent the relative movement from occurring when vibrations are set up in the brake shoe. That is to say, if the attachment of the weight to the shoe is too tight, less damping of the vibrations will be effected and squeaking of the brakes will in consequence not be reduced to the same extent. With correct pressure between the brake shoe and weight dependent upon the frictional nature of the contacting surfaces, it is possible to absorb or damp the vibrations to such an extent that no squeak can be heard when the shoe is in contact with the drum.

What I claim as my invention and desire to secure by Letters Patent of the United States is:—

1. The combination with a vehicle brake having a brake drum co-operating with internally-expanding brake shoes, of a weight yieldingly connected with each of said shoes for limited movement with respect thereto, friction material interposed between the adjacent surfaces of each of said shoes and weights.

2. The combination with a vehicle brake having a co-operating drum and brake shoe, of a weight supported adjacent said shoe for limited movement with respect to said shoe, means yieldingly pressing said weight against said shoe.

3. In a vehicle brake, a brake shoe, a longitudinal web on said shoe, a weight supported by said web, means resiliently pressing said weight into contact with said web.

4. In a vehicle brake, a brake shoe, a longitudinal web on said shoe, a weight supported by said web, a friction material on one of the adjacent surfaces of said web and weight, means resiliently pressing said weight into contact with said web.

5. In a vehicle brake, a brake shoe, a longitudinal web on said shoe, a weight supported by said web, the connection between said web and weight being through friction material, means resiliently pressing said friction material into contact with said web.

6. In a vehicle brake, a brake shoe having a channel in said shoe and a hole through the base of said channel, a weight, means supporting said weight and extending through said hole so as to permit relative movement between said weight and shoe, means for resiliently holding said weight in contact with said shoe.

7. In a vehicle brake, a brake shoe having a channel in said shoe and a hole through the base of said channel, a weight, a hole through said weight, a stud extending through said holes so as to allow a limited relative movement, spring means associated with said stud to press said weight into frictional contact with said channel.

In testimony whereof I affix my signature.

HUBERT NOEL CHARLES.